(12) United States Patent
Nakanishi et al.

(10) Patent No.: US 11,462,946 B2
(45) Date of Patent: Oct. 4, 2022

(54) NON-CONTACT POWER SUPPLY SYSTEM AND POWER TRANSMISSION DEVICE

(71) Applicant: Mitsubishi Electric Corporation, Tokyo (JP)

(72) Inventors: Takuya Nakanishi, Tokyo (JP); Tomokazu Sakashita, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/257,585

(22) PCT Filed: Jul. 5, 2019

(86) PCT No.: PCT/JP2019/026881
§ 371 (c)(1),
(2) Date: Jan. 4, 2021

(87) PCT Pub. No.: WO2020/049853
PCT Pub. Date: Mar. 12, 2020

(65) Prior Publication Data
US 2021/0143680 A1 May 13, 2021

(30) Foreign Application Priority Data
Sep. 5, 2018 (JP) ............................. JP2018-166109

(51) Int. Cl.
*H02J 50/12* (2016.01)
*B60L 53/12* (2019.01)
(Continued)

(52) U.S. Cl.
CPC .............. *H02J 50/12* (2016.02); *B60L 53/12* (2019.02); *B60L 53/20* (2019.02); *B60L 2210/30* (2013.01); *H02J 50/80* (2016.02)

(58) Field of Classification Search
CPC .. H02J 50/12; H02J 50/80; H02J 50/40; H02J 7/00; B60L 53/12; B60L 53/20;
(Continued)

(56) References Cited

U.S. PATENT DOCUMENTS 3,967,173 A * 6/1976 Stich ....................... H02P 27/08
318/811
2008/0218111 A1 * 9/2008 Okamura .................. H02P 6/15
318/453
(Continued)

FOREIGN PATENT DOCUMENTS

JP      2014-7864 A    1/2014
JP      2014-23426 A    2/2014
(Continued)

OTHER PUBLICATIONS

International Search Report and Written Opinion dated Sep. 10, 2019, received for PCT Application No. PCT/JP2019/026881, Filed on Jul. 5, 2019, 10 pages including English Translation.
(Continued)

*Primary Examiner* — Rexford N Barnie
*Assistant Examiner* — Brian K Baxter
(74) *Attorney, Agent, or Firm* — Xsensus LLP

(57) ABSTRACT

A first converter performs power conversion and outputs AC power. The AC power outputted from the first converter is supplied to a first coil. The first coil is magnetically coupled with a second coil, and the AC power is transmitted from the first coil to the second coil. A second converter is connected to the second coil, and converts the AC power transmitted to the second coil to DC power and supplies the DC power to a load. A first control unit controls the first converter so as to alternately switch between a first state of outputting rectangular wave voltage which cyclically changes and a
(Continued)

second state of outputting constant reference voltage, on the basis of required power of the load.

13 Claims, 8 Drawing Sheets

(51) Int. Cl.
    *B60L 53/20*         (2019.01)
    *H02J 50/80*        (2016.01)

(58) Field of Classification Search
    CPC .............. B60L 2210/30; B60L 53/122; Y02T 10/7072; Y02T 10/70
    See application file for complete search history.

(56) References Cited

U.S. PATENT DOCUMENTS

| | | | |
|---|---|---|---|
| 2009/0179886 A1* | 7/2009 | Yang | H05B 45/37 345/211 |
| 2010/0176757 A1* | 7/2010 | Yamakawa | H02P 21/22 318/400.09 |
| 2010/0259207 A1* | 10/2010 | Kitanaka | H02P 21/22 318/400.17 |
| 2014/0021922 A1 | 1/2014 | Kim | |
| 2014/0375251 A1* | 12/2014 | Sakai | H02J 50/05 320/107 |
| 2015/0028688 A1* | 1/2015 | Masaoka | B60L 53/65 307/104 |
| 2015/0171820 A1 | 6/2015 | Koike et al. | |
| 2016/0276844 A1* | 9/2016 | Gekinozu | H02J 1/102 |
| 2016/0311426 A1* | 10/2016 | Sato | B60L 15/2045 |
| 2017/0093225 A1* | 3/2017 | Murayama | H02J 7/025 |
| 2017/0098965 A1* | 4/2017 | Kikuchi | H02J 50/50 |
| 2017/0279310 A1* | 9/2017 | Ii | H02J 50/12 |
| 2018/0212477 A1* | 7/2018 | Misawa | H02J 5/005 |
| 2018/0241301 A1* | 8/2018 | Nagaoka | H02M 1/14 |
| 2018/0342878 A1 | 11/2018 | Nagaoka | |

FOREIGN PATENT DOCUMENTS

| | | |
|---|---|---|
| JP | 2015-213392 A | 11/2015 |
| JP | 2016-86472 A | 5/2016 |
| JP | 2017-70035 A | 4/2017 |
| JP | 2017-184493 A | 10/2017 |
| WO | 2015/181847 A1 | 12/2015 |

OTHER PUBLICATIONS

Notice of Reasons for Refusal dated Dec. 3, 2019, received for JP Application 2019-555502, 8 pages including English Translation.
Extended European search report dated Sep. 22, 2021, in corresponding European patent Application No. 19857165.5, 8 pages.

* cited by examiner

NON-CONTACT POWER SUPPLY SYSTEM AND POWER TRANSMISSION DEVICE

CROSS-REFERENCE TO RELATED APPLICATIONS

The present application is based on PCT filing PCT/JP2019/026881, filed Jul. 5, 2019, which claims priority to JP 2018-166109, filed Sep. 5, 2018, the entire contents of each are incorporated herein by reference.

TECHNICAL FIELD

The present invention relates to a non-contact power supply system and a power transmission device.

BACKGROUND ART

There is technology of transmitting power with high efficiency in a non-contact manner through magnetic field coupling between a pair of coils separated from each other. This technology is categorized into non-contact power supply technology of a magnetic field coupling type, and for example, application to charging of a battery of an electric vehicle (EV) or a plug-in hybrid electric vehicle (PHEV) is considered.

In a non-contact power supply system using the above technology, the impedance varies when the positions of the pair of coils are changed relative to each other or power fed to a load is changed. Variation in the impedance can be a factor of reducing power transmission efficiency. In order to solve such a problem, various technologies for suppressing reduction in transmission efficiency due to variation in the impedance are being developed (for example, Patent Document 1).

CITATION LIST

Patent Document

Patent Document 1: Japanese Laid-Open Patent Publication No. 2014-7864

SUMMARY OF THE INVENTION

Problems to be Solved by the Invention

In the non-contact power supply system, efficiency of power transmission between the coils is reduced when power lower than predetermined rated power is transmitted. In Patent Document 1, the impedance on the power receiving side is adjusted by adjusting the duty cycle of switching operation in a DC/DC converter. However, when the adjustment amount of the impedance increases, loss in the DC/DC converter and loss in a power-receiving-side rectifier increase. In addition, since the adjustment amount of the impedance using the DC/DC converter is limited, it is difficult to suppress reduction in transmission efficiency depending on the magnitude of transmitted power.

The present invention has been made to solve the above problem, and an object of the present invention is to obtain a non-contact power supply system and a power transmission device that can supply a desired magnitude of power to a load while suppressing reduction in power transmission efficiency.

Solution to the Problems

A non-contact power supply system according to the present invention includes: a first converter which performs power conversion and outputs AC power; a first coil supplied with the AC power outputted from the first converter; a second coil magnetically coupled with the first coil so that the AC power is transmitted from the first coil to the second coil; a second converter which is connected to the second coil, and which converts the AC power transmitted to the second coil, to DC power, and supplies the DC power to a load; and a control unit for controlling the first converter so as to alternately switch between a first state of outputting rectangular wave voltage which cyclically changes and a second state of outputting constant reference voltage, on the basis of required power of the load.

Effect of the Invention

The present invention makes it possible to supply a desired magnitude of power to a load while suppressing reduction in power transmission efficiency.

DESCRIPTION OF EMBODIMENTS

Hereinafter, a non-contact power supply system and a power transmission device according to embodiments of the present invention will be described with reference to the drawings.

Embodiment 1

(1) Configuration

Figure 1:
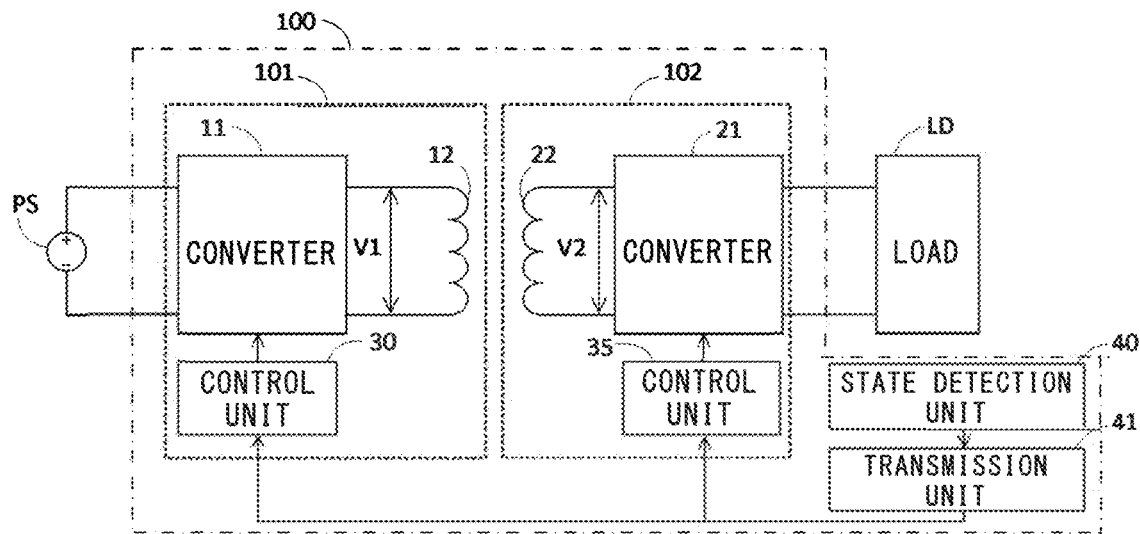
FIG. 1 is a schematic diagram showing a basic configuration of a non-contact power supply system according to embodiment 1.

FIG. 1 is a schematic diagram showing a basic configuration of a non-contact power supply system according to the present embodiment. A non-contact power supply system 100 in FIG. 1 includes a power conversion device 101 and a power conversion device 102. The power conversion device 101 includes a first converter 11, a first coil 12, and a first control unit 30. The power conversion device 102 includes a second converter 21, a second coil 22, and a second control unit 35. It is noted that the power conversion device 101 corresponds to a power transmission device in the claims, and the power conversion device 102 corresponds to a power receiving device in the claims. In addition, the second coil 22 corresponds to a power receiving coil in the claims, and the second converter 21 corresponds to a power-receiving-side converter in the claims.

The first and second converters 11, 21 perform power conversion from AC to DC or from DC to AC. Each of the first and second converters 11, 21 is a half-bridge circuit or a full-bridge circuit including a plurality of semiconductor switches, for example. In this example, the first converter 11 converts DC power to AC power, and the second converter 21 converts AC power to DC power. In this case, the second converter 21 may be configured as a diode bridge. A DC-side terminal of the first converter 11 is connected to a DC power supply PS, and a DC-side terminal of the second converter 21 is connected to a load LD. The load LD is a battery or an electric apparatus, for example.

The first coil 12 is connected to an AC-side terminal of the first converter 11. AC power outputted from the first converter 11 is supplied to the first coil 12. The second coil 22 is magnetically coupled with the first coil 12, so that the AC power is transmitted from the first coil 12 to the second coil 22. The second coil 22 is connected to an AC-side terminal of the second converter 21. The AC power transmitted to the second coil 22 is supplied to the second converter 21. The first and second coils 12, 22 are provided so as to be spaced from each other. Thus, power is transmitted in a non-contact manner from the power conversion device 101 to the power conversion device 102. The power conversion device 101 may include a resonance capacitor connected in series or parallel to the first coil 12 or connected in another connection manner. Similarly, the power conversion device 102 may include a resonance capacitor connected in series or parallel to the second coil 22 or connected in another connection manner. With the resonance capacitors, power can be supplied with a high power factor and high efficiency from the power conversion devices 101, 102.

Each of the first and second control units 30, 35 includes a central processing unit (CPU) and a memory, for example. The first and second control units 30, 35 respectively control the first and second converters 11, 21 on the basis of required power of the load LD (hereinafter, referred to as load required power). The load required power may be stored in advance in the memories of the first and second control units 30, 35, or may be calculated by the first or second control unit 30, 35 on the basis of power information described later. It is noted that one of the first and second control units 30, 35 may control both of the first and second converters 11, 21.

The non-contact power supply system 100 further includes a state detection unit 40 and a transmission unit 41. The state detection unit 40 detects, as power information, at least one of current, voltage, and power supplied from the second converter 21 to the load LD. The transmission unit 41 transmits the power information detected by the state detection unit 40 to the first and second control units 30, 35. The first and second control units 30, 35 calculate power (hereinafter, referred to as load supply power) supplied from the second converter 21 to the load LD, on the basis of the power information transmitted from the transmission unit 41, and control the first and second converters 11, 21 so that the calculated load supply power approaches the load required power.

The non-contact power supply system 100 may be configured to be capable of transmitting power in both directions. In this case, the first converter 11 and the second converter 21 have the same function and each of the first and second converters 11, 21 operates in accordance with the power transmission direction. That is, the function of the first converter 11 in the case where power is transmitted from the power conversion device 101 to the power conversion device 102, and the function of the second converter 21 in the case where power is transmitted from the power conversion device 102 to the power conversion device 101, are equal to each other. A load may be connected to the DC-side terminal of the first converter 11, and a power supply may be connected to the DC-side terminal of the second converter 21. Further, in the case where a load is connected to the DC-side terminal of the first converter 11, a state detection unit for detecting at least one of current, voltage, and power supplied to the load as power information, and a transmission unit for transmitting the detected power information to the first and second control units 30, 35, may be provided.

(2) Operation

A basic operation of the non-contact power supply system 100 will be described. DC power is supplied from the power supply PS to the first converter 11. The first converter 11 converts the DC power supplied from the power supply PS, to AC power, and supplies the AC power to the first coil 12. AC current flows through the first coil 12, so that an AC magnetic field is generated around the first coil 12. The AC magnetic field is interlinked with the second coil 22, whereby AC power (induced electromotive force) based on electromagnetic induction is generated in the second coil 22. Thus, the AC power is transmitted from the first coil 12 to the second coil 22. The AC power transmitted to the second coil 22 is supplied to the second converter 21. The second converter 21 converts the AC power supplied from the second coil 22, to DC power, and supplies the DC power to the load LD.

The first control unit 30 switches the operation state of the first converter 11 between a first state and a second state on the basis of the load required power. The first converter 11 outputs rectangular wave voltage in the first state, and outputs reference voltage in the second state. The rectangular wave voltage is voltage that cyclically changes in a rectangular wave shape. The reference voltage is constant voltage. The first converter 11 is capable of outputting the rectangular wave voltage through continuous switching operation and outputting the reference voltage by stopping the switching operation. The cycle of voltage change of the rectangular wave voltage is a switching cycle of the first converter 11, i.e., the cycle of AC power outputted from the first converter 11. The second control unit 35 controls the second converter 21 so as to correspond to operation of the first converter 11. Specifically, when the first converter 11 is in the first state, the second converter 21 performs continuous switching operation, and when the first converter 11 is in the second state, the second converter 21 stops the switching operation. In order to cause operations of the first and second converters 11, 21 to correspond to each other, the first control unit 30 and the second control unit 35 may respectively control the first and second converters 11, 21 while communicating with each other.

Figure 2:
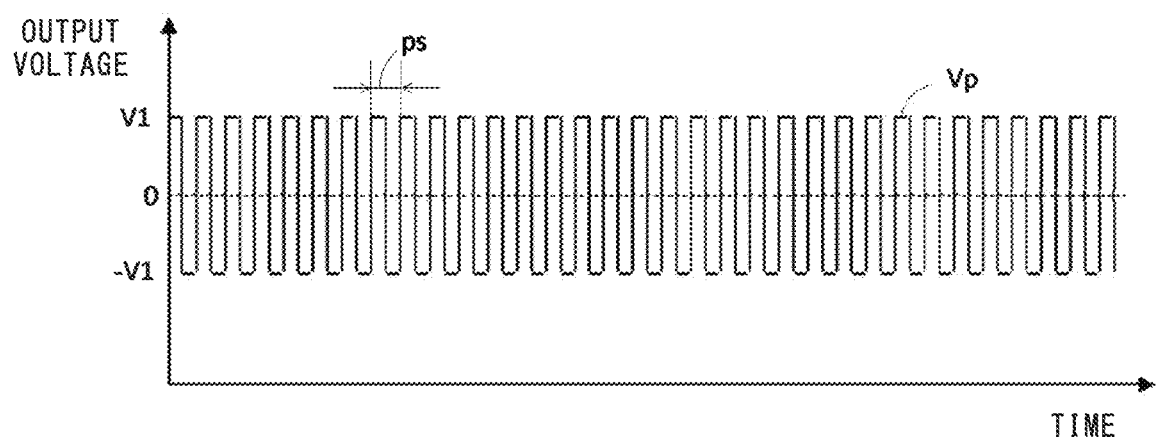
FIG. 2 illustrates the relationship between output voltage and load supply power in embodiment 1.
Figure 3:
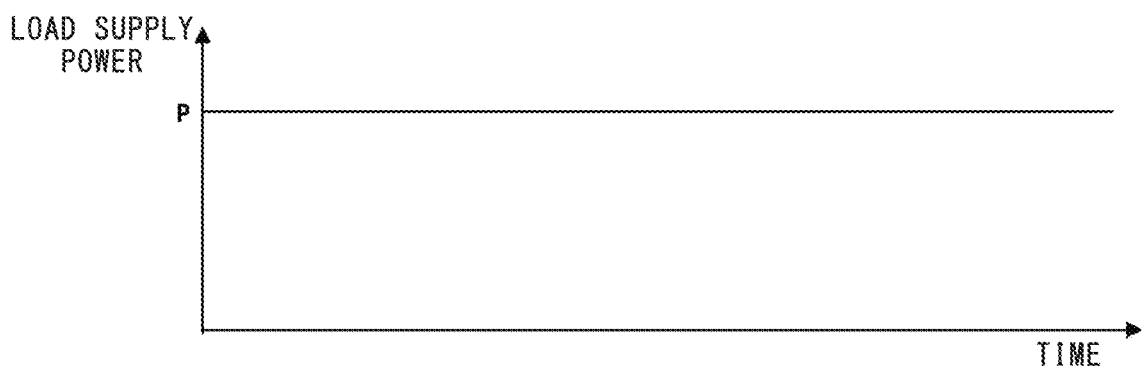
FIG. 3 illustrates the relationship between output voltage and load supply power in embodiment 1.
Figure 4:
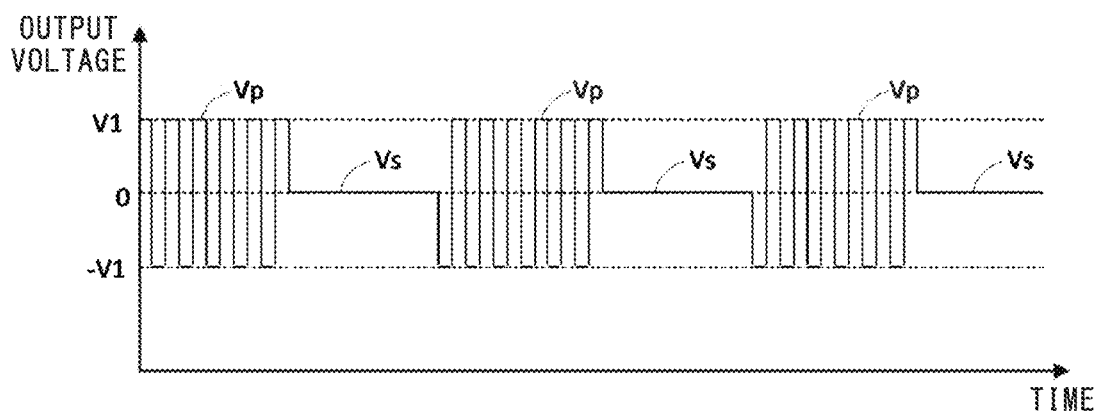
FIG. 4 illustrates the relationship between output voltage and load supply power in embodiment 1.
Figure 5:
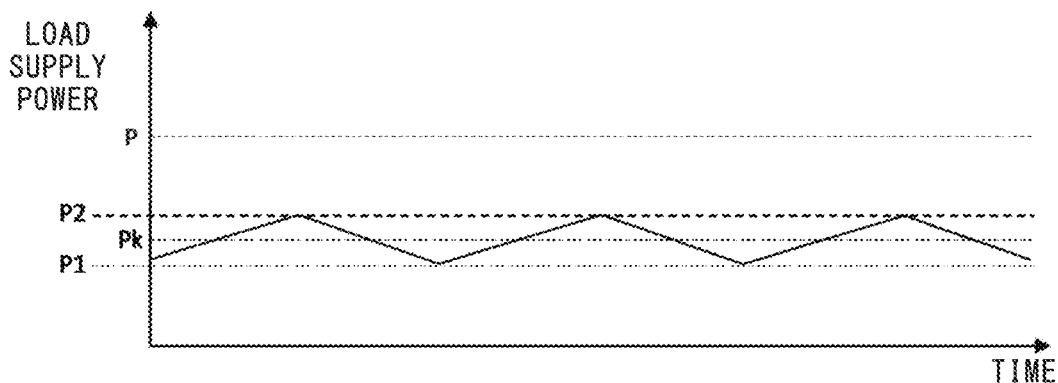
FIG. 5 illustrates the relationship between output voltage and load supply power in embodiment 1.

Hereinafter, the details of operation of the first converter 11 will be described. FIG. 2 to FIG. 5 illustrate the relationship between voltage (hereinafter, referred to as output voltage) outputted from the first converter 11 and the load supply power. In FIG. 2 and FIG. 4, the horizontal axis indicates time and the vertical axis indicates the output voltage. In FIG. 3 and FIG. 5, the horizontal axis indicates time and the vertical axis indicates the load supply power.

FIG. 2 and FIG. 3 show examples of changes in the output voltage and the load supply power in the case where the load required power is predetermined rated power. In the case where the load required power is rated power, the first control unit 30 controls the first converter 11 continuously in the first state. Thus, rectangular wave voltage is continuously outputted from the first converter 11. In the example in FIG. 2, the first converter 11 continuously outputs rectangular wave voltage Vp. The rectangular wave voltage Vp cyclically changes in a rectangular wave shape between positive voltage V1 and negative voltage −V1. The frequency of the rectangular wave voltage Vp is not less than 80 kHz and is less than 90 kHz for example. Hereinafter, the cycle of change between the voltage V1 and the voltage −V1 of the rectangular wave voltage Vp is referred to as unit cycle ps. During a period in which the rectangular wave voltage Vp is outputted from the first converter 11, the load supply power is kept substantially constant at rated power P as shown in FIG. 3.

FIG. 4 and FIG. 5 show examples of changes in the output voltage and the load supply power in the case where the load required power is smaller than rated power. In the case where the load required power is smaller than rated power, the first control unit 30 alternately switches the operation state of the first converter 11 between the first state and the second state. In the example in FIG. 4, the first converter 11 outputs the rectangular wave voltage Vp and reference voltage Vs alternately with a certain cycle. In this example, the reference voltage Vs is 0 V. Hereinafter, operation in which the rectangular wave voltage Vp and the reference voltage Vs are alternately outputted is referred to as alternate output operation.

In the alternate output operation, the load supply power repeatedly increases and decreases. In the example in FIG. 5, the load supply power cyclically increases and decreases between power P1 and power P2. The power P2 is greater than the power P1. In addition, the powers P1, P2 are smaller than the rated power P. During a period in which the rectangular wave voltage Vp is outputted from the first converter 11 (hereinafter, referred to as rectangular wave voltage period), the load supply power gradually increases. During a period in which the reference voltage Vs is outputted from the first converter 11 (hereinafter, referred to as reference voltage period), the load supply power gradually decreases. Power outputted from the first converter 11 during the rectangular wave voltage period is the rated power P instantaneously, and power outputted from the first converter 11 during the reference voltage period is 0 instantaneously. In this case, average power Pk of the power P1 and the power P2 can be considered to be substantial load supply power. It is noted that the rectangular wave voltage period corresponds to a first control period in the claims, and the reference voltage period corresponds to a second control period in the claims.

Each of the rectangular wave voltage period and the reference voltage period is set to be longer than the unit cycle ps of the rectangular wave voltage Vp. In addition, in order to stably control the load supply power, it is preferable that each of the rectangular wave voltage period and the reference voltage period is equal to or longer than ten cycles. Here, n cycles (n is a positive integer) mean n times the length of the unit cycle ps.

Figure 6:
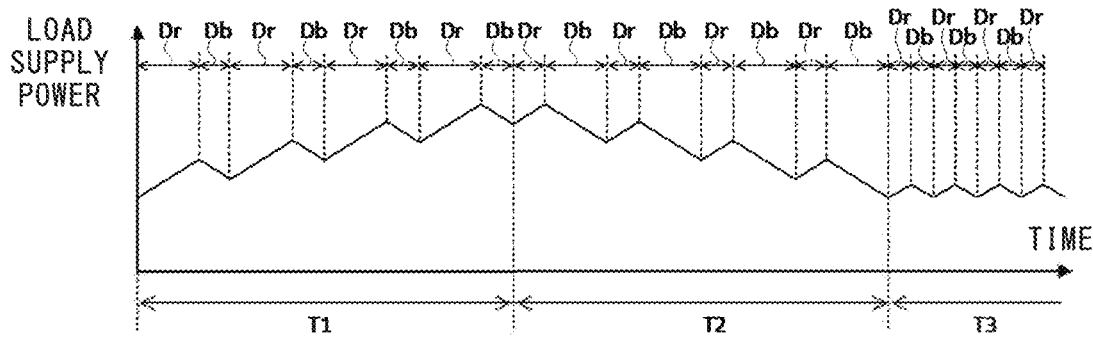
FIG. 6 shows an example of adjustment for a period ratio in embodiment 1.

The load supply power can be adjusted by adjusting the ratio between the length of the rectangular wave voltage period and the length of the reference voltage period. Hereinafter, the ratio between the length of the rectangular wave voltage period and the length of the reference voltage period in a continuous pair of the rectangular wave voltage period and the reference voltage period is referred to as period ratio. FIG. 6 shows an example of adjustment for the period ratio. In FIG. 6, the horizontal axis indicates time and the vertical axis indicates the load supply power. In a period T1 in FIG. 6, each rectangular wave voltage period Dr is longer than each reference voltage period Db. Therefore, the increase width of the load supply power in each rectangular wave voltage period Dr is greater than the decrease width of the load supply power in each reference voltage period Db. Thus, the load supply power gradually increases. The greater the ratio of the rectangular wave voltage period Dr is, the higher the increase rate of the load supply power is. In a period T2, each reference voltage period Db is longer than each rectangular wave voltage period Dr. Therefore, the decrease width of the load supply power in each reference voltage period Db is greater than the increase width of the load supply power in each rectangular wave voltage period Dr. Thus, the load supply power gradually decreases. The greater the ratio of the reference voltage period Db is, the higher the decrease rate of the load supply power is. In a period T3, the increase width of the load supply power in each rectangular wave voltage period Dr and the decrease width of the load supply power in each reference voltage period Db are equal to each other. Thus, the load supply power oscillates in a certain range. In this case, the shorter the rectangular wave voltage period and the reference voltage period are, the smaller the oscillation width of the load supply power is. Thus, the load supply power is stabilized.

As described above, the load supply power can be freely changed by adjusting the period ratio. In the present embodiment, the period ratio is adjusted so that the load supply power approaches the load required power, through feedback control using the power information. The control operation of the first converter 11 will be described later.

The degree of change in the load supply power differs depending on various conditions. Therefore, the degree of change in the load supply power may be acquired as change information in advance, and the first converter 11 may be controlled on the basis of the change information. For example, the increase rate of the load supply power in each rectangular wave voltage period Dr and the decrease rate of the load supply power in each reference voltage period Db may be acquired in advance, and the period ratio may be calculated on the basis of the acquired increase rate and decrease rate. In this case, the load supply power can be accurately adjusted. The period ratio when the increase width of the load supply power in each rectangular wave voltage period Dr and the decrease width of the load supply power in each reference voltage period Db are equal to each other may be determined as a reference ratio in advance, and the period ratio may be adjusted using the reference ratio as a reference. In this case, the load supply power can be easily increased or decreased.

Figure 7:
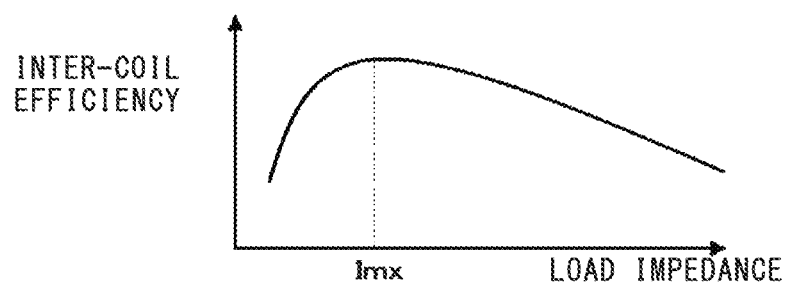
FIG. 7 shows the relationship between inter-coil efficiency and a load impedance in embodiment 1.

FIG. 7 shows the relationship between efficiency (hereinafter, referred to as inter-coil efficiency) of power transmission between the first and second coils 12, 22 and the impedance of the load LD. In FIG. 7, the horizontal axis indicates the impedance of the load LD and the vertical axis indicates the inter-coil efficiency. The inter-coil efficiency reaches a peak when the impedance of the load LD has a certain value. In the example in FIG. 7, the inter-coil efficiency reaches a peak when the impedance of the load LD is a value Imx. The value of the impedance when the inter-coil efficiency becomes a peak depends on the design of the non-contact power supply system 100. The design of the non-contact power supply system 100 includes the number of turns of the first and second coils 12, 22, the lengths thereof, and the like.

In order to enhance power transmission efficiency of the non-contact power supply system 100, the non-contact power supply system 100 is preferably designed such that the inter-coil efficiency becomes the peak. Accordingly, for example, the impedance of the load LD when the load supply power is the rated power is calculated, and the non-contact power supply system 100 is designed such that the inter-coil efficiency becomes the peak at the calculated impedance.

For example, it is assumed that the non-contact power supply system 100 is used for charging of a battery of an electric vehicle, the power supply PS is a power grid, and the load LD is the battery. The rated power of the non-contact power supply system is, for example, 3 kW. The battery voltage is approximately constant and is, for example, 350 V. In the case where power of 3 kW is supplied for load voltage of 350 V, the impedance is 41Ω. Accordingly, the non-contact power supply system 100 is designed such that the inter-coil efficiency is maximized at the impedance of 41Ω. In the case where the battery of the electric vehicle is charged with power from the power grid, the charging is performed at the rated power (3 kW) during 90% or more of the charging period. Therefore, the inter-coil efficiency is kept approximately at the peak.

On the other hand, the non-contact power supply system 100 may be used for supplying power from a battery of an electric vehicle to another electric apparatus (e.g., a general home electric apparatus). For example, the non-contact power supply system 100 is provided so as to be capable of transmitting power in both directions, the battery of the electric vehicle is connected to the second converter 21, and in this state, another electric apparatus as a load is connected to the first converter 11. In this case, power is supplied from the battery of the electric vehicle through the power conversion device 102 and then the power conversion device 101 to the other electric apparatus. Unlike the case where power is supplied from the power grid to the electric vehicle, in the case where power is supplied from the electric vehicle to another electric apparatus, the magnitude of transmitted power depends on the amount of power consumption by the other electric apparatus. Except for a large-power-consumption electric apparatus such as an air conditioner, power consumed in a general home is about 1 kW or less. In this case, the inter-coil efficiency is greatly reduced. Such a situation is not preferable, in terms of effective usage of power and an economic standpoint.

In order to enhance the inter-coil efficiency, for example, it is conceivable to reduce variation in the load impedance using a DC/DC converter. However, in this case, loss in the DC/DC converter is increased, and the cost is increased due to complication of the configuration. Regarding this, in the present embodiment, the first converter 11 (or second converter 21) outputs the rectangular wave voltage and the reference voltage alternately. During the rectangular wave voltage period, the rated power is instantaneously outputted from the first converter 11 (or second converter 21), and therefore the inter-coil efficiency is equal or close to that in the case of power transmission at the rated power. Thus, power can be transmitted with high efficiency. In addition, power transmitted between the first converter 11 and the second converter 21 during the reference voltage period is 0 instantaneously, so that transmission loss between the first and second coils 12, 22 is 0. As a result, desired power lower than the rated power can be supplied to the load while reduction in the transmission efficiency is suppressed.

Figure 8:
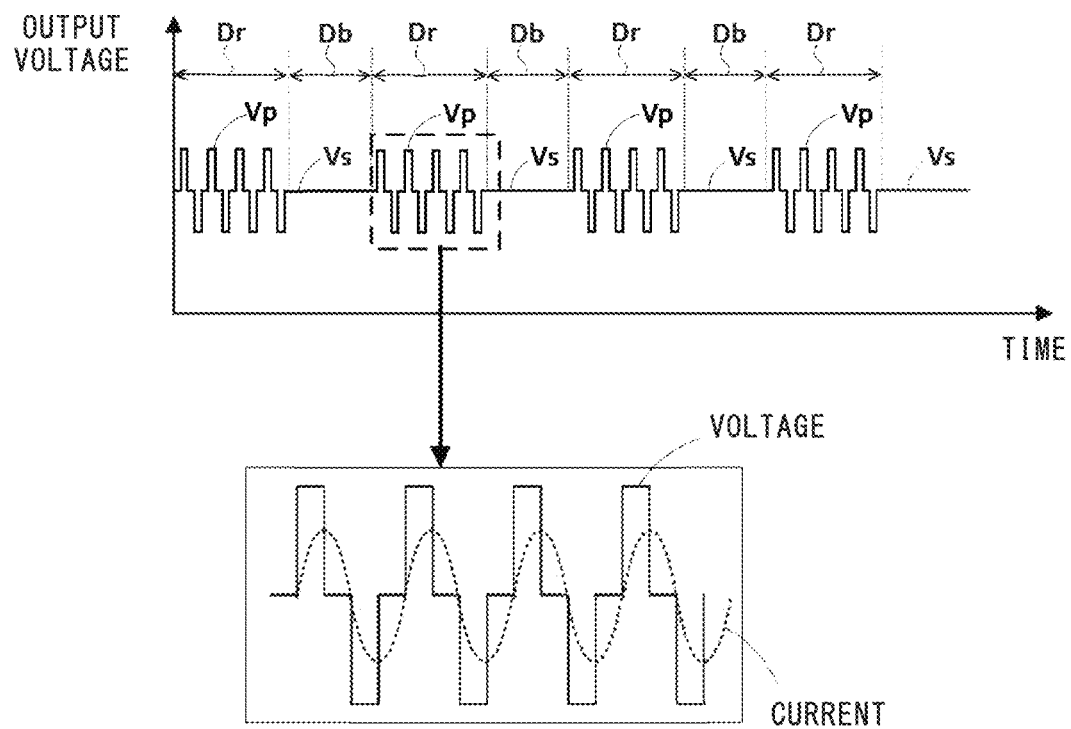
FIG. 8 shows an example in which alternate output operation and phase shift operation are used in combination, in embodiment 1.
Figure 9:
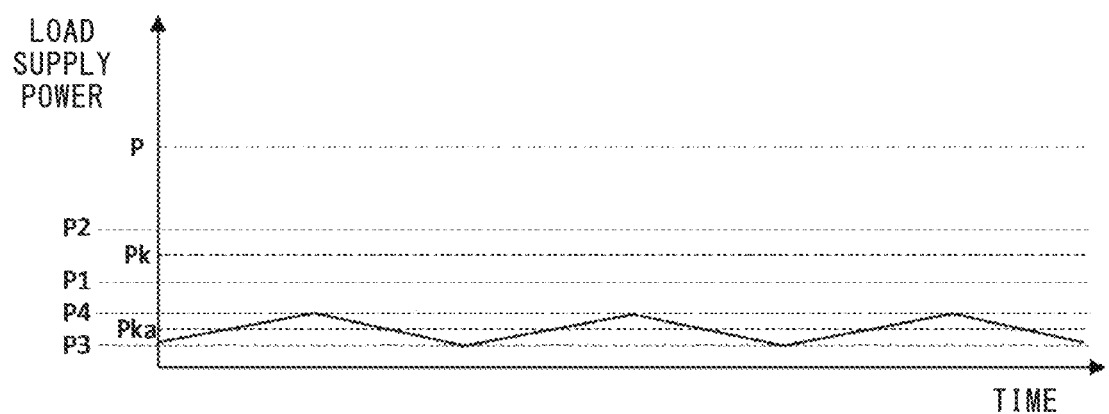
FIG. 9 shows the example in which alternate output operation and phase shift operation are used in combination, in embodiment 1.

The first control unit 30 may control the first converter 11 so as to perform phase shift operation in addition to the alternate output operation. In the case where the first converter 11 is a full-bridge circuit having a pair of legs, the phase shift operation is achieved by shifting the phase of switching for one leg and the phase of switching for the other leg relative to each other. FIG. 8 and FIG. 9 show changes in the output voltage of the first converter 11 and the load supply power in the case where the alternate output operation and the phase shift operation are used in combination. In FIG. 8, the horizontal axis indicates time and the vertical axis indicates the output voltage. A part of the rectangular wave voltage Vp in FIG. 8 is shown to be enlarged. In addition, change in current outputted from the first converter 11 is indicated by a dotted line. In FIG. 9, the horizontal axis indicates time and the vertical axis indicates the load supply power.

In the example in FIG. 8, the phase shift operation is performed in the rectangular wave voltage period Dr. Specifically, in one cycle, the period in which the output voltage is kept at 0 V is increased, and the period in which the output voltage is kept at V1 and the period in which the output voltage is kept at −V1 are decreased. In this case, as shown in FIG. 9, the load supply power repeatedly increases and decreases between power P3 and power P4. The powers P3, P4 are respectively smaller than the powers P1, P2 in FIG. 4 5. Thus, the substantial load supply power is power Pka smaller than the power Pk in FIG. 4 5. The shorter the period in which the output voltage is kept at V1 and the period in which the output voltage is kept at −V1 are, the smaller the substantial load supply power is.

In non-contact power supply of a magnetic field coupling type, LC resonance is often used. It takes a time to reach a steady state (a state in which LC resonance is stably performed) from a state in which energy in a resonance capacitor (not shown) or the first and second coils 12, 22 is zero. Therefore, if one rectangular wave voltage period is extremely short, current (power) might not reach the steady state within each rectangular wave voltage period. For example, in order to supply power that is 1/10 of the rated power to the load LD, the rectangular wave voltage period having a length of four cycles (four times the unit cycle ps) and the reference voltage period having a length of thirty-six cycles (thirty-six times the unit cycle ps) are provided alternately. In this case, the current (power) might not reach the steady state within each rectangular wave control period and as a result, the actual load supply power might not become smaller than 1/10 of the rated power.

Accordingly, the alternate output operation and the phase shift operation are performed simultaneously as described above. For example, the rectangular wave voltage period having a length of eight cycles and the reference voltage period having a length of thirty-two cycles are provided alternately, whereby the load supply power is reduced to 1/5 of the rated power, and further, through the phase shift operation, the load supply power is reduced to 1/2. In this case, the length of one rectangular wave voltage period becomes two times as compared to the case of not performing the phase shift operation. Therefore, the power (current) can reach the steady state within each rectangular wave voltage period. Thus, the load supply power can be appropriately controlled.

In the case of adjusting the load supply power to 1/10 of the rated power by only the phase shift operation without performing the alternate output operation, power outputted from the first converter 11 becomes 1/10 of the rated power and the impedance of the load LD becomes ten times. Thus, the inter-coil efficiency is greatly reduced. On the other hand, in the case of adjusting the load supply power to 1/10 of the rated power by using the alternate output operation and the phase shift operation in combination as described above, power outputted from the first converter 11 becomes 1/2 of the rated power and the impedance of the load LD becomes two times. Thus, reduction in the inter-coil efficiency is suppressed. In this way, by using the alternate output operation and the phase shift in combination, it becomes possible to appropriately control the load supply power while suppressing reduction in the inter-coil efficiency.

Figure 10:
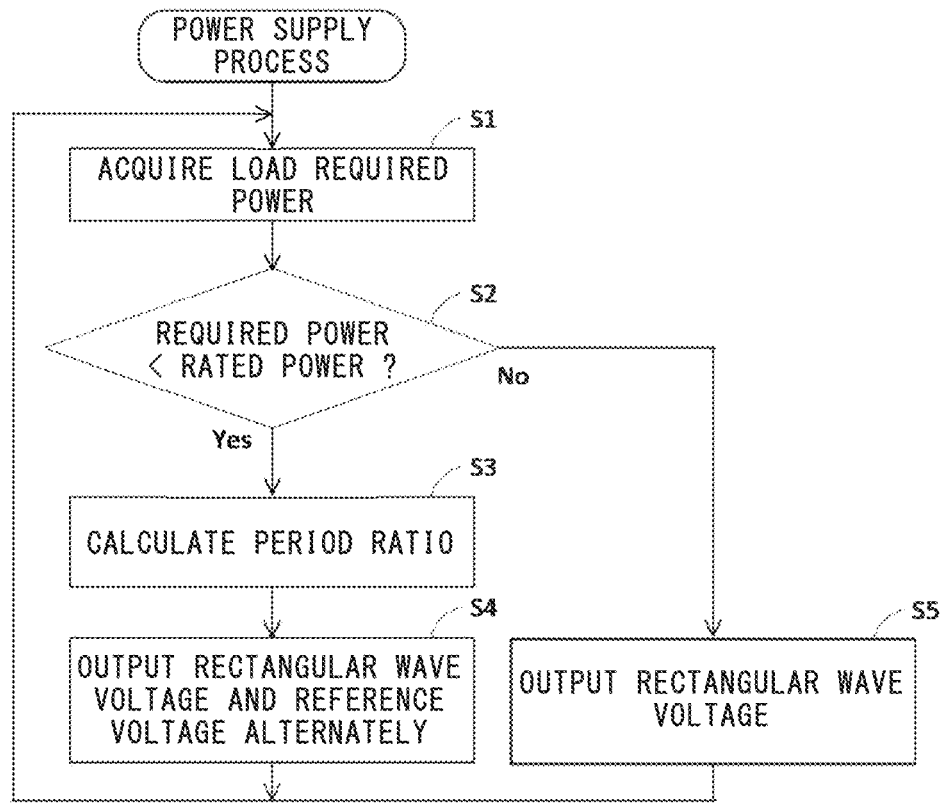
FIG. 10 is a flowchart showing a power supply process in embodiment 1.

The first control unit 30 of the non-contact power supply system 100 performs a power supply process for supplying power to the load LD by executing a power supply program stored in the memory. FIG. 10 is a flowchart showing the power supply process by the first control unit 30. It is noted that, in the case where the non-contact power supply system 100 is capable of transmitting power in both directions and power is transmitted from the power conversion device 102 to the power conversion device 101, the second control unit 35 of the power conversion device 102 performs the power supply process shown in FIG. 10.

In the example in FIG. 10, in step S1, the first control unit 30 acquires the load required power. In this case, the first control unit 30 may calculate the load required power on the basis of the power information transmitted from the transmission unit 41. In step S2, the first control unit 30 determines whether or not the acquired required power is smaller than the rated power. If the required power is smaller than the rated power, the first control unit 30 proceeds to step S3, and if the required power is equal to or greater than the rated power, the first control unit 30 proceeds to step S5.

In step S3, the first control unit 30 calculates the period ratio between the rectangular wave voltage period and the reference voltage period on the basis of the power information transmitted from the transmission unit 41. In step S4, the first control unit 30 controls the first converter 11 so as to operate in the first and second states alternately on the basis of the calculated period ratio, and returns to step S1. Thus, the first converter 11 performs the alternate output operation of outputting the rectangular wave voltage and the reference voltage alternately at the calculated period ratio. In step S4, the first control unit 30 may control the first converter 11 so as to perform the alternate output operation and the phase shift operation simultaneously. In step S5, the first control unit 30 controls the first converter 11 so as to operate in the first state, and returns to step S1. Thus, the first converter 11 continuously outputs the rectangular wave voltage. In this way, it is possible to supply desired power to the load LD while suppressing reduction in the transmission efficiency.

Embodiment 2

Figure 11:
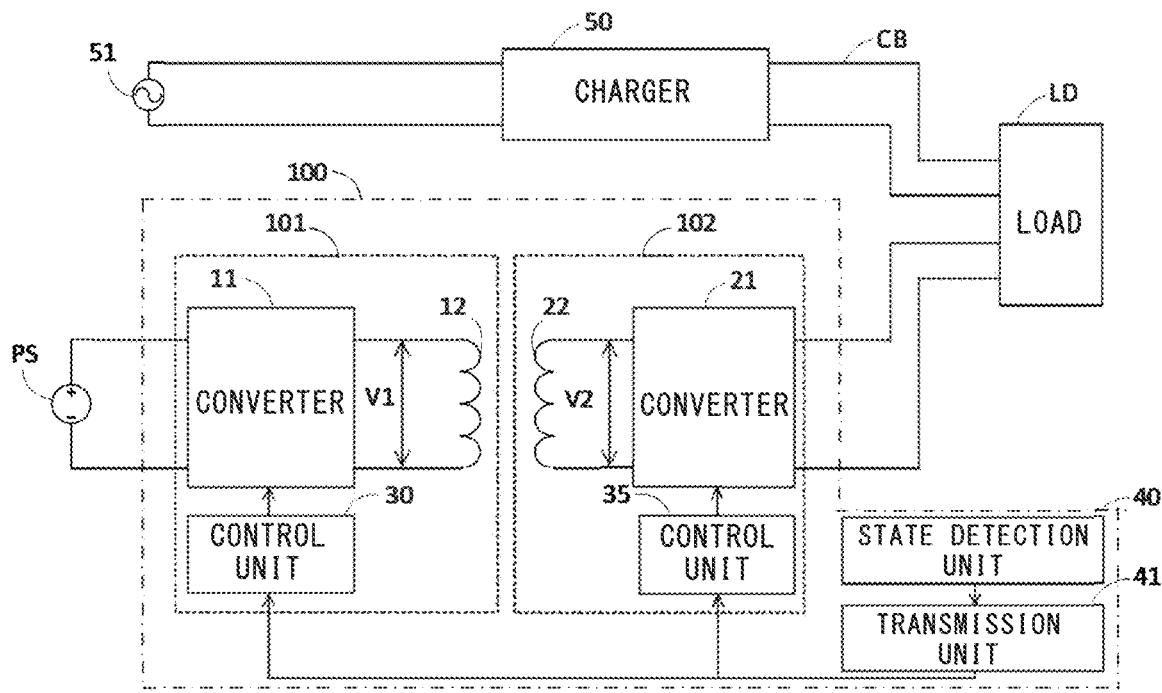
FIG. 11 is a schematic diagram showing the configuration of a non-contact power supply system according to embodiment 2.

Embodiment 2 of the present invention will be described regarding a difference from the above embodiment 1. FIG. 11 is a schematic diagram showing the configuration of a non-contact power supply system 100 according to embodiment 2. As shown in FIG. 11, in embodiment 2, a charger 50 is connected to a load LD via a cable CB. The charger 50 is an example of another power supply device. In this example, the load LD is a battery.

The charger 50 is connected to an AC power supply 51. The charger 50 includes an AC/DC converter and a DC/DC converter. The charger 50 converts AC power supplied from the AC power supply 51, to DC power and supplies the DC power to the load LD, thereby charging the load LD.

Thus, while the non-contact power supply system 100 charges the load LD, the charger 50 charges the load LD. The charger 50 is designed to be capable of transmitting specific prescribed power with high efficiency, and continuously supplies the prescribed power to the load LD. The first and second control units 30, 35 of the non-contact power supply system 100 control the first and second converters 11, 21 so that the sum of the load supply power and the prescribed power of the charger 50 becomes the load required power. Specifically, the first control unit 30 calculates a difference value between the load required power and the prescribed power of the charger 50 on the basis of the power information from the transmission unit 41. The first control unit 30 controls the first converter 11 so that the calculated difference value becomes the load supply power. The second control unit 35 controls the second converter 21 so as to correspond to operation of the first converter 11.

As described above, the non-contact power supply system 100 can supply desired power lower than the rated power to the load LD while suppressing reduction in the transmission efficiency. Therefore, while the charger 50 continuously supplies the prescribed power which can be transmitted with high efficiency, the non-contact power supply system 100 can supply power corresponding to the difference between the load required power and the prescribed power to the load LD, with high efficiency. Thus, it is possible to reduce loss in both of the charger 50 and the non-contact power supply system 100.

Embodiment 3

Figure 12:
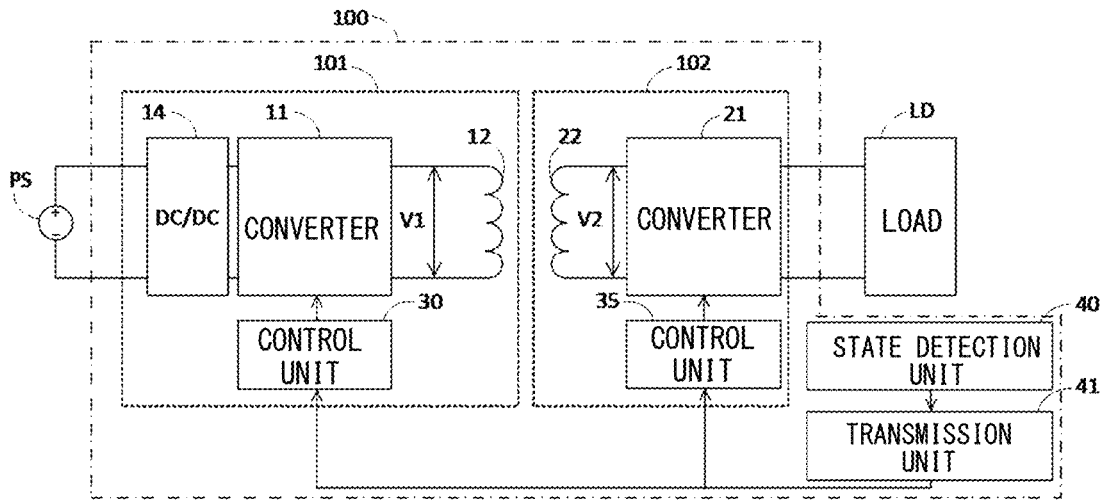
FIG. 12 is a schematic diagram showing the configuration of a non-contact power supply system according to embodiment 3.

Embodiment 3 of the present invention will be described regarding a difference from the above embodiment 2. FIG. 12 is a schematic diagram showing the configuration of a non-contact power supply system 100 according to embodiment 3. In the non-contact power supply system 100 in FIG. 12, the power conversion device 101 includes a DC/DC converter 14 between the first converter 11 and the power supply PS. The DC/DC converter 14 corresponds to a third converter in the claims.

The DC/DC converter 14 adjusts voltage to be supplied from the power supply PS to the first converter 11. As described above, it is conceivable to use the intermittent output operation and the phase shift operation in combination in order to reduce power outputted from the first converter 11. Meanwhile, if the phase shift operation is performed, the possibility that not soft switching but hard switching is performed, increases. Therefore, loss in the first converter 11 is likely to increase.

In the present embodiment, voltage to be supplied to the first converter 11 can be reduced by the DC/DC converter 14. Therefore, without performing the phase shift operation in the first converter 11, it is possible to sufficiently reduce transmitted power between the first and second coils 12, 22 using power conversion by the DC/DC converter 14 and the intermittent output operation by the first converter 11 in combination. In this case, execution of soft switching in the first converter 11 is facilitated. Thus, increase in loss in the first converter 11 can be suppressed.

Embodiment 4

Figure 13:
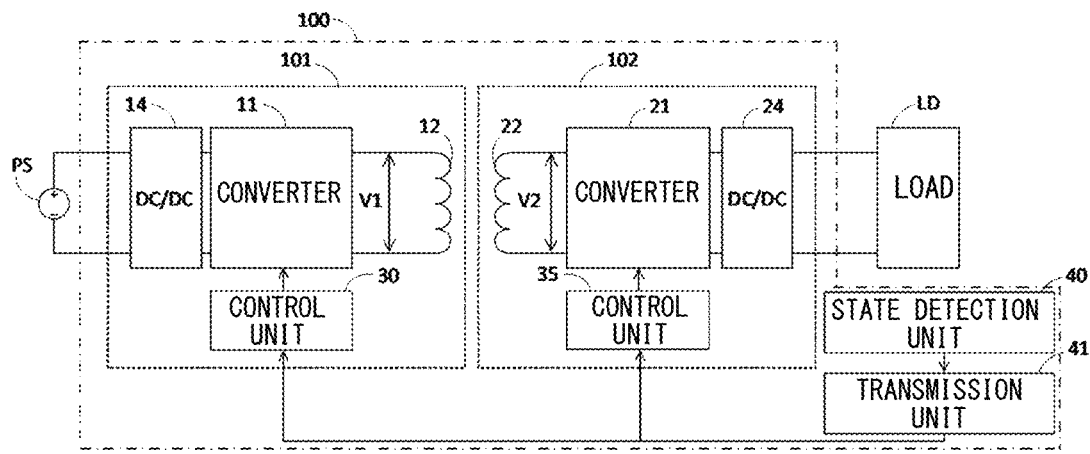
FIG. 13 is a schematic diagram showing the configuration of a non-contact power supply system according to embodiment 4.

Embodiment 4 of the present invention will be described regarding a difference from the above embodiment 1. FIG. 13 is a schematic diagram showing the configuration of a non-contact power supply system 100 according to embodiment 4. In the non-contact power supply system 100 in FIG. 13, the power conversion device 102 includes a DC/DC converter 24 between the second converter 21 and the load LD. The DC/DC converter 24 performs power conversion between the second converter 21 and the load LD. The DC/DC converter 24 corresponds to a fourth converter in the claims.

Figure 14:
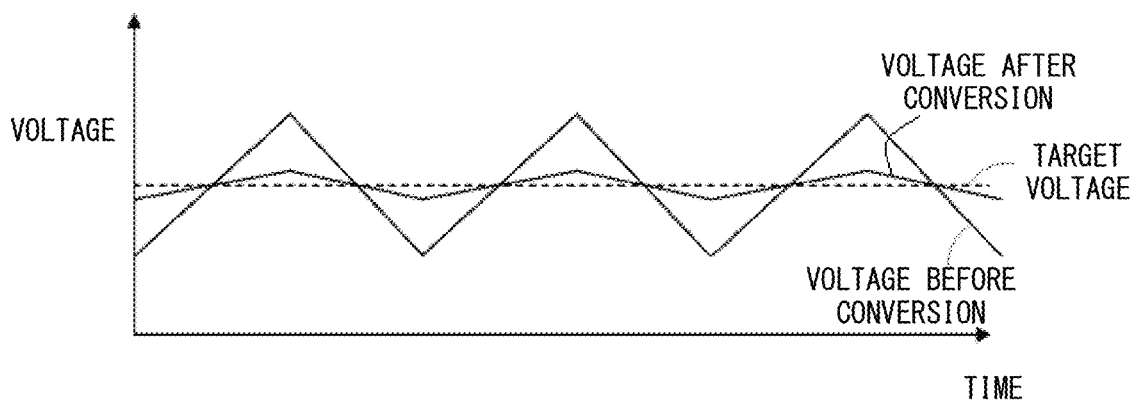
FIG. 14 illustrates an example of operation of a DC/DC converter in embodiment 4.

FIG. 14 illustrates an example of power conversion by the DC/DC converter 24. Specifically, voltage before the power conversion by the DC/DC converter 24, voltage after the power conversion, and target voltage (voltage corresponding to the load required power) are shown. In FIG. 14, the horizontal axis indicates time and the vertical axis indicates each voltage. In the case where the first converter 11 performs the alternate output operation, voltage and current supplied to the load LD vary. If the capacitance of a capacitor in the power conversion device 101 is increased, it is possible to suppress variations in the voltage and the current supplied to the load LD even in the case where the first converter 11 performs the alternate output operation. However, in this case, it is necessary to increase the size of the capacitor, leading to size increase and cost increase of the power conversion device 101. Accordingly, in the present embodiment, the DC/DC converter 24 performs power conversion so that variations in the voltage and the current supplied to the load LD are reduced. Thus, while reduction in the transmission efficiency is suppressed by the alternate output operation of the first converter 11, power lower than the rated power can be stably supplied to the load LD.

Embodiment 5

Figure 15:
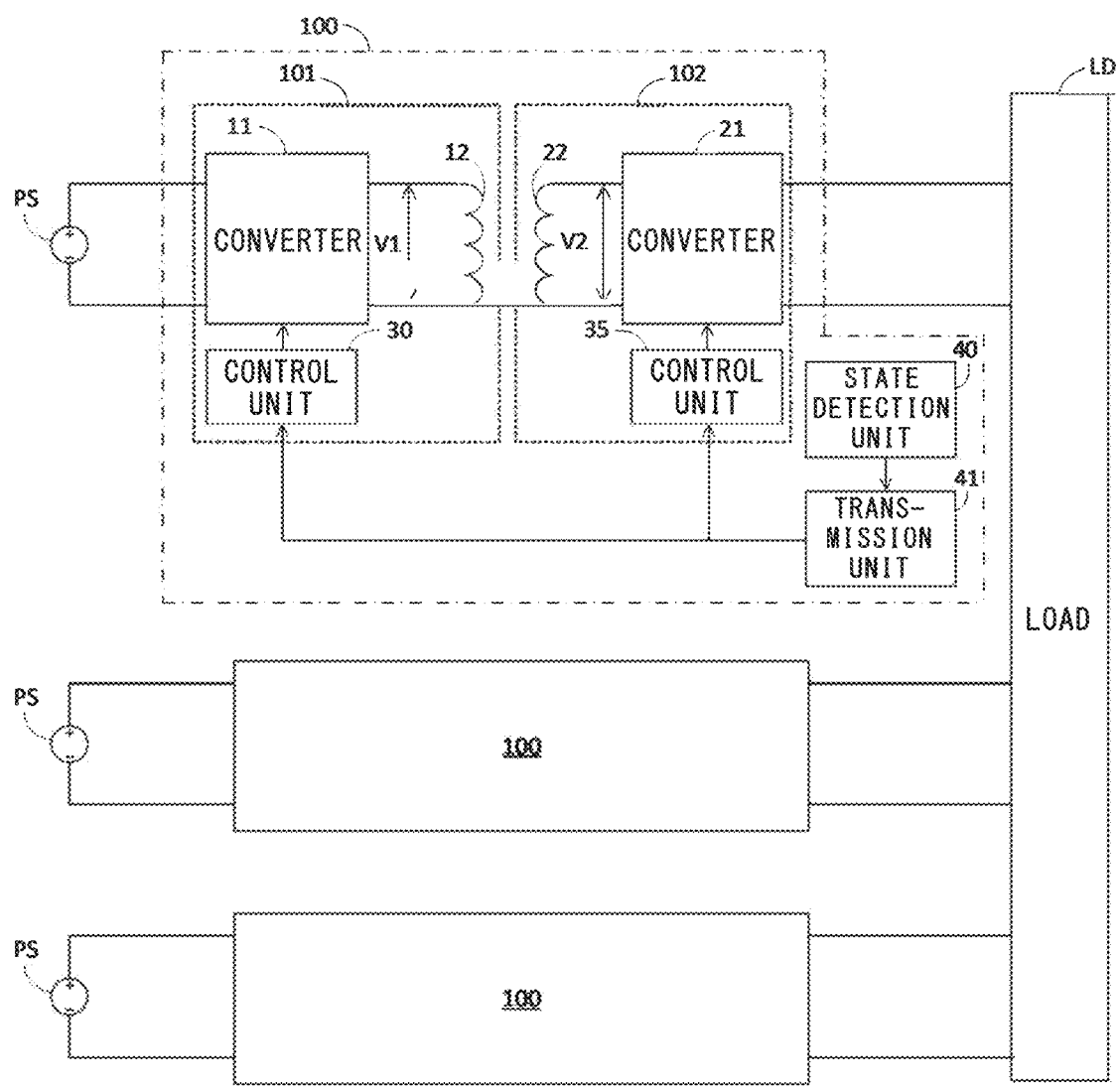
FIG. 15 is a schematic diagram showing the configuration of a non-contact power supply system according to embodiment 5.

Embodiment 5 of the present invention will be described regarding a difference from the above embodiment 1. FIG. 15 is a schematic diagram showing the configuration of a non-contact power supply system 100 according to embodiment 5. As shown in FIG. 15, in embodiment 5, a plurality of non-contact power supply systems 100 are connected to a common load LD. The load LD is a facility or equipment that consumes comparatively large power, e.g., a residence, an office, or a factory. Each non-contact power supply system 100 is connected to the power supply PS. The power supply PS is, for example, a battery of an electric vehicle.

In the example in FIG. 15, each non-contact power supply system 100 has the same configuration as in the above embodiment 1. In the example in FIG. 15, three non-contact power supply systems 100 are connected to the load LD. Hereinafter, the three non-contact power supply systems 100 are respectively referred to as non-contact power supply systems 100A, 100B, 100C. In addition, the first converters 11 of the non-contact power supply systems 100A, 100B, 100C are respectively referred to as first converters 11A, 11B, 11C. It is noted that each non-contact power supply system 100 may have the same configuration as in the above embodiment 3 or 4. In addition, the number of the non-contact power supply systems 100 is not limited to three, but two non-contact power supply systems 100 or four or more non-contact power supply systems 100 may be connected to the load LD.

Figure 16:
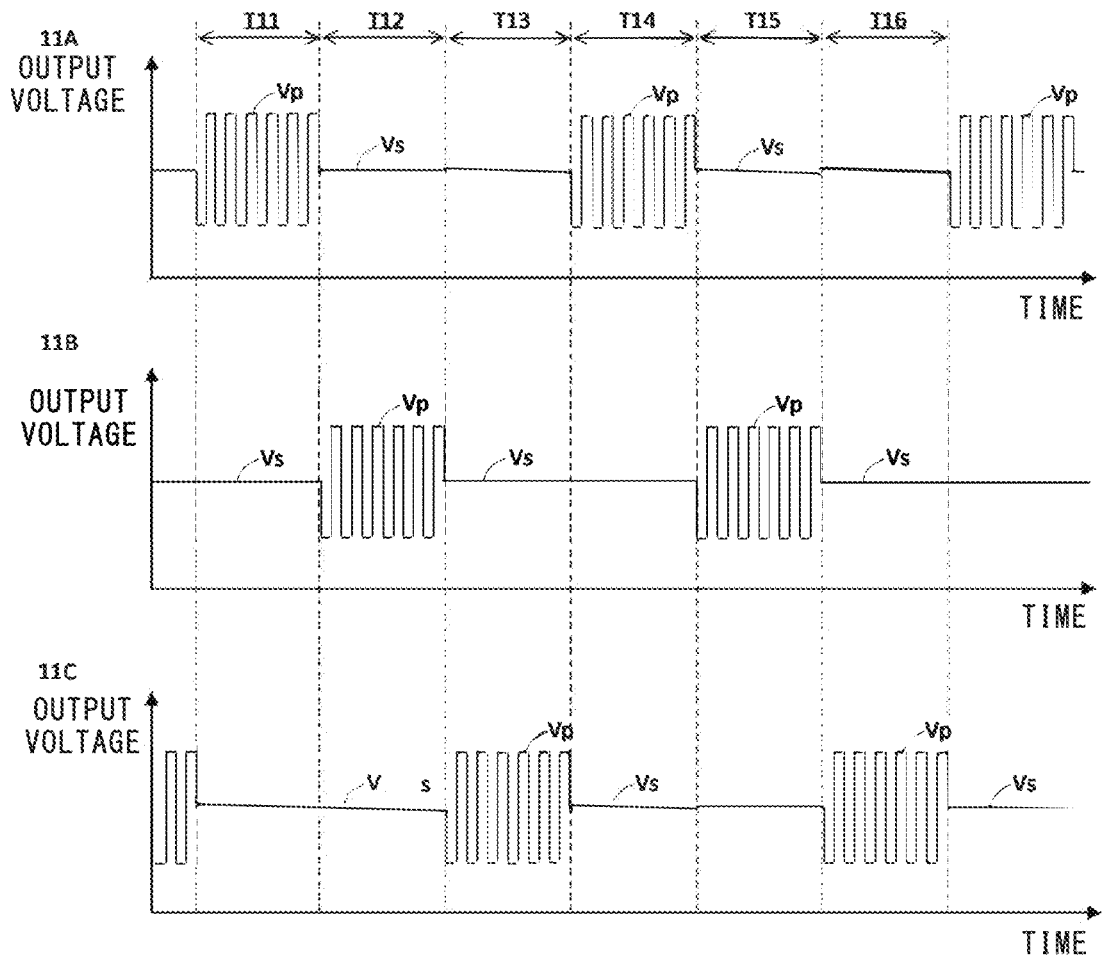
FIG. 16 illustrates operation of a first converter in embodiment 5.
Figure 17:
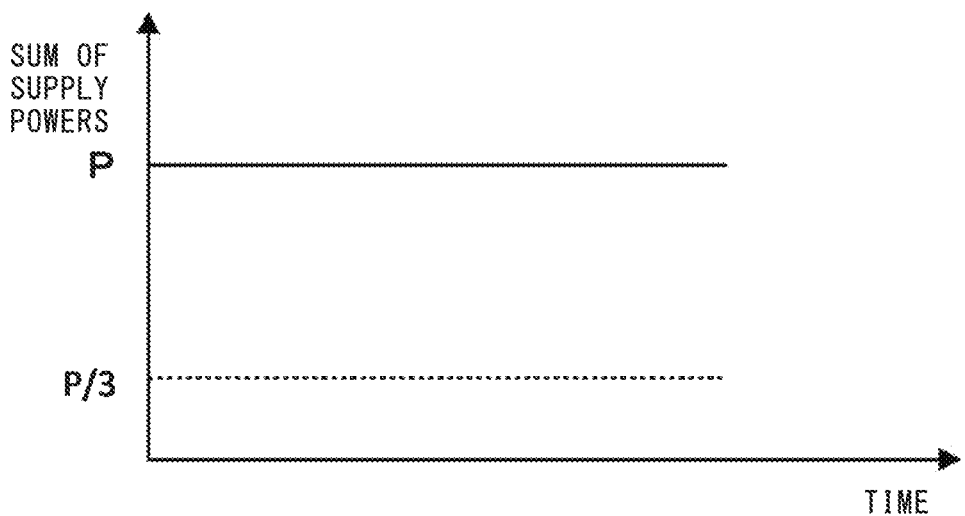
FIG. 17 illustrates operation of the first converter in embodiment 5.
Figure 18:
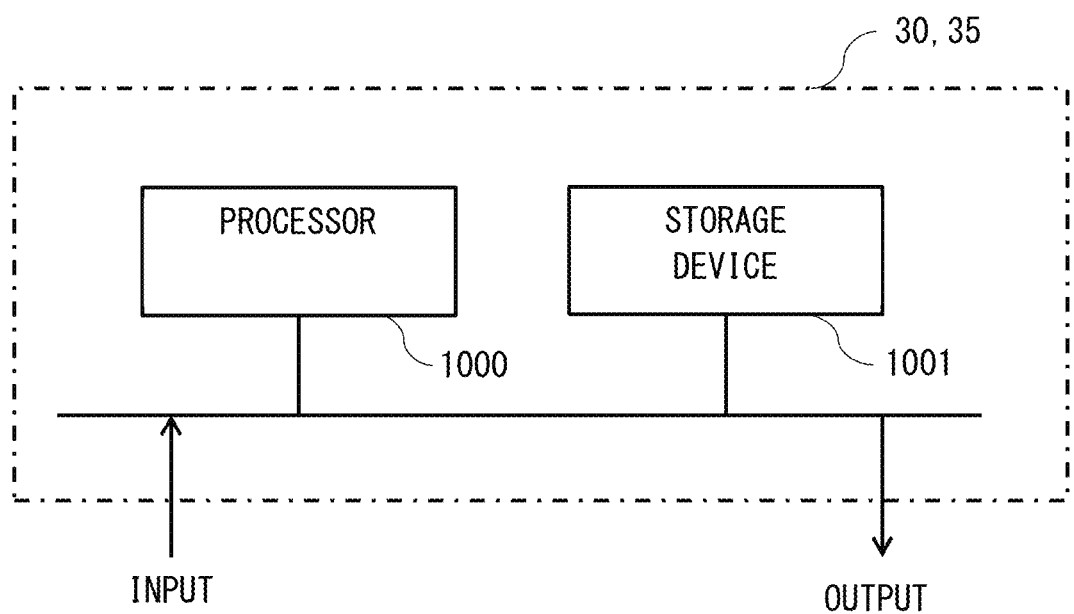
FIG. 18 is a hardware configuration diagram of the control unit.

FIG. 16 and FIG. 17 illustrate operations of the first converters 11A, 11B, 11C. In FIG. 16, the horizontal axis indicates time and the vertical axis indicates the output voltage. Changes in the output voltages of the first converters 11A, 11B, 11C are respectively shown at the upper stage, the middle stage, and the lower stage in FIG. 16. In FIG. 17, the horizontal axis indicates time and the vertical axis indicates the sum of powers supplied to the load LD from the non-contact power supply systems 100A, 100B, 100C.

In the example in FIG. 16, the first converter 11A outputs the rectangular wave voltage Vp in periods T11, T14, and outputs the reference voltage Vs in periods T12, T13, T15, T16. The first converter 11B outputs the rectangular wave voltage Vp in periods T12, T15, and outputs the reference voltage Vs in periods T11, T13, T14, T16. The first converter 11C outputs the rectangular wave voltage Vp in periods T13, T16, and outputs the reference voltage Vs in periods T11, T12, T14, T15.

As described above, the first converters 11A, 11B, 11C of the non-contact power supply systems 100A, 100B, 100C output the rectangular wave voltage Vp in an order in a time-division manner. In addition, during the period in which one of the first converters of the first converters 11A, 11B, 11C outputs the rectangular wave voltage Vp, the other two first converters output the reference voltage. Thus, the rated power P is continuously supplied to the load LD as shown in the example in FIG. 17.

For example, the three non-contact power supply systems 100 in FIG. 15 can be used for supplying power from three electric vehicles to a factory. In this case, the battery of each electric vehicle corresponds to each power supply PS in FIG. 15, and power equipment of the factory corresponds to the load LD in FIG. 15. In the case where the required power of the factory is the rated power P, it is conceivable that the three electric vehicles each supply 1/3 (P/3 in FIG. 17) of the rated power P to the factory. However, in this case, since the load supply power from each non-contact power supply system 100 is smaller than the rated power P, the transmission efficiency is reduced. Alternatively, it is also conceivable that one electric vehicle continuously supplies the rated power P to the factory. However, in this case, power of the battery of the one electric vehicle is consumed in a concentrative manner, so that the life of that battery is shortened. In the present embodiment, the plurality of electric vehicles supply power to the factory in a time-division manner, whereby reduction in the efficiency of power transmission from each electric vehicle can be suppressed and it is possible to prevent a situation in which the lives of the batteries of some of the electric vehicles are shortened.

Other Embodiments

In the above embodiments, a DC power supply is used as the power supply PS, and DC power is supplied from the power supply PS to the first converter 11. However, an AC power supply may be used as the power supply PS, and AC power may be supplied from the power supply PS to the first converter 11. In this case, the first converter 11 performs power conversion (e.g., frequency conversion) between AC power and AC power.

In the above embodiments, the reference voltage is 0 V. However, the reference voltage may be other than 0 V. For example, the reference voltage may be the upper limit value (positive voltage) of the rectangular wave voltage or may be the lower limit value (negative voltage) of the rectangular wave voltage. Specifically, in the example in FIG. 4, the reference voltage Vs may be the voltage V1 or the voltage −V1.

FIG. 15 shows an example of hardware of the first and second control units 30,35. Each of the first and second control units 30,35 is composed of a processor 1000 and a storage unit 1001 as shown in FIG. 15. The storage unit 1001 includes, although not shown, a volatile storage device such as a random access memory, and a nonvolatile auxiliary storage device such as a flash memory. The storage unit 1001 may include, instead of a flash memory, an auxiliary storage device such as a hard disk. The processor 1000 executes a program loaded from the storage unit 1001. In this case, the program is loaded from the auxiliary storage device to the processor 1000 via the volatile storage device. The processor 1000 may output data of the calculation result and the like to the volatile storage device of the storage unit 1001, or may store the data in the auxiliary storage device via the volatile storage device.

DESCRIPTION OF THE REFERENCE CHARACTERS 11 first converter
12 first coil
14, 24 DC/DC converter
21 second converter
22 second coil
30 first control unit
35 second control unit
40 state detection unit
41 transmission unit
50 charger
100 non-contact power supply system
101 power conversion device
102 power conversion device
LD load
PS DC power supply

The invention claimed is:

1. A non-contact power supply system comprising:
a first converter which performs power conversion and outputs AC power;
a first coil supplied with the AC power outputted from the first converter;
a second coil magnetically coupled with the first coil so that the AC power is transmitted from the first coil to the second coil;
a second converter which is connected to the second coil, and which converts the AC power transmitted to the second coil, to DC power, and supplies the DC power to a load; and
a controller to control the first converter so as to alternately switch between a first state of outputting rectangular wave voltage which cyclically changes and a second state of outputting constant reference voltage, and the controller adjusts a period ratio which is a ratio between a length of a first control period in which the first converter is controlled in the first state and a length of a second control period in which the first converter is controlled in the second state, on the basis of required power of the load.

2. The non-contact power supply system according to claim 1, wherein
the second control period is longer than a cycle of voltage change in the rectangular wave voltage,
the controller calculates supply power from the second converter to e load on the basis of at least one of current, voltage, or power supplied to the load, and adjusts the period ratio so that the calculated supply power approaches the required power, and
in a case where the supply power to the load is smaller than the required power even when the period ratio is adjusted, the controller adjusts the period ratio while adjusting keeping periods in which the rectangular wave voltage is kept at positive voltage and negative voltage by shifting a phase of switching in the first converter so that a steady state in which LC resonance is stably performed is reached within the first control period and the supply power to the load approaches the required power.

3. The non-contact power supply system according to claim 2, wherein
when the required power is a predetermined value, the controller continuously controls the first converter in the first state, and when the required power is smaller than the predetermined value, the controller alternately switches the first converter between the first state and the second state.

4. The non-contact power supply system according to claim 1, wherein
in a case where, while power is supplied from the second converter to the load, power is supplied from another power supply device to the load, the controller controls the first converter on the basis of a difference between the required power and the power supplied from the other power supply device to the load.

5. The non-contact power supply system according to claim wherein
in a case where, while power is supplied from the own non-contact power supply system to the load, power is supplied from one or more other non-contact power supply systems to the load, the controller controls the own first converter in the second state when the first converter of any of the other non-contact power supply systems is in the first state, and the controller controls the own first converter in the first state when the first converters of all the other non-contact power supply systems are in the second state.

6. The non-contact power supply system according to claim 1, wherein
power is supplied from a power supply via a third converter to the first converter, and
the controller controls the first and third converters on the basis of the required power.

7. The non-contact power supply system according to claim 1, further comprising a third converter capable of power conversion, the third converter being provided between the second converter and the load, wherein
the controller controls the first and third converters on the basis of the required power.

8. The non-contact power supply system according to claim 1, further comprising a first power conversion device and a second power conversion device each configured to be capable of transmitting power in both directions, wherein
the first power conversion device includes the first converter and the first coil, and includes the controller as a first controller,
the second power conversion device includes the second converter and the second coil, and includes a second controller to control the second converter,
in a first condition in which power is transmitted from the first power conversion device to the second power conversion device, AC power outputted from the first converter is supplied to the first coil, the AC power supplied to the first coil is transmitted from the first coil to the second coil, the AC power transmitted to the second coil is converted to DC power by the second converter, and the DC power is supplied to a first load,
in the first condition, on the basis of required power of the first load, the first controller controls the first converter so as to alternately switch between a first state of outputting rectangular wave voltage which cyclically changes and a second state of outputting constant reference voltage, and adjusts a period ratio which is a ratio between a length of a first control period in which the first converter is controlled in the first state and a length of a second control period in which the first converter is controlled in the second state,
in a second condition in which power is transmitted from the second power conversion device to the first power conversion device, AC power outputted from the second converter is supplied to the second coil, the AC power supplied to the second coil is transmitted from the second coil to the first coil, the AC power transmitted to the first coil is converted to DC power by the first converter, and the DC power is supplied to a second load, and
in the second condition, on the basis of required power of the second load, the second controller controls the second converter so as to alternately switch between the first state and the second state, and adjusts a period ratio which is a ratio between a length of a third control period in which the second converter is controlled in the first state and a length of a fourth control period in which the second converter is controlled in the second state.

9. The non-contact power supply system according to claim 1, wherein instantaneous power outputted from the first converter during the second state is 0.

10. The non-contact power supply system according to claim 1, wherein the constant reference voltage output in the second state is 0 volts.

11. A power transmission device for supplying power to a load via a power receiving device having a power receiving coil and a power-receiving-side converter, the power transmission device comprising:
a converter which performs power conversion and outputs AC power;
a coil magnetically coupled with the power receiving coil and supplied with the AC power from the convener; and
a controller to control the converter so as to alternately switch between a first state of outputting rectangular wave voltage which cyclically changes and a second state of outputting constant reference voltage, and the controller adjusts a period ratio which is a ratio between a length of a first control period in which the converter is controlled in the first state and a length of a second control period in which the converter is controlled in the second state, on the basis of required power of the load.

12. The power transmission device according to claim 11, wherein
the second control period is longer than a cycle of voltage change in the rectangular wave voltage,
the controller calculates supply power from the power-receiving-side converter to the load on the basis of at least one of current, voltage, or power supplied to the load, and adjusts the period ratio so that the calculated supply power approaches the required power, and
in a case where the supply power to the load is smaller than the required power even when the period ratio is adjusted, the control unit adjusts the period ratio while adjusting keeping periods in which the rectangular wave voltage is kept at positive voltage and negative voltage by shifting a phase of switching in the converter so that a steady state in which LC resonance is stably performed is reached within the first control period and the supply power to the load approaches the required power.

13. The power transmission device according to claim 11, wherein
in a case where, while power is supplied from the own power transmission device to the load via the power receiving device corresponding to the own power transmission device, power is supplied from one or more other power transmission devices to the load via one or more other power receiving devices respectively corresponding to the one or more other power transmission devices, the controller controls the own converter in the second state when the converter of any of the other power transmission devices is in the first state, and the controller controls the own converter in the first stale when the converters of all the other power transmission devices are in the second state.

* * * * *